Patented Aug. 26, 1952

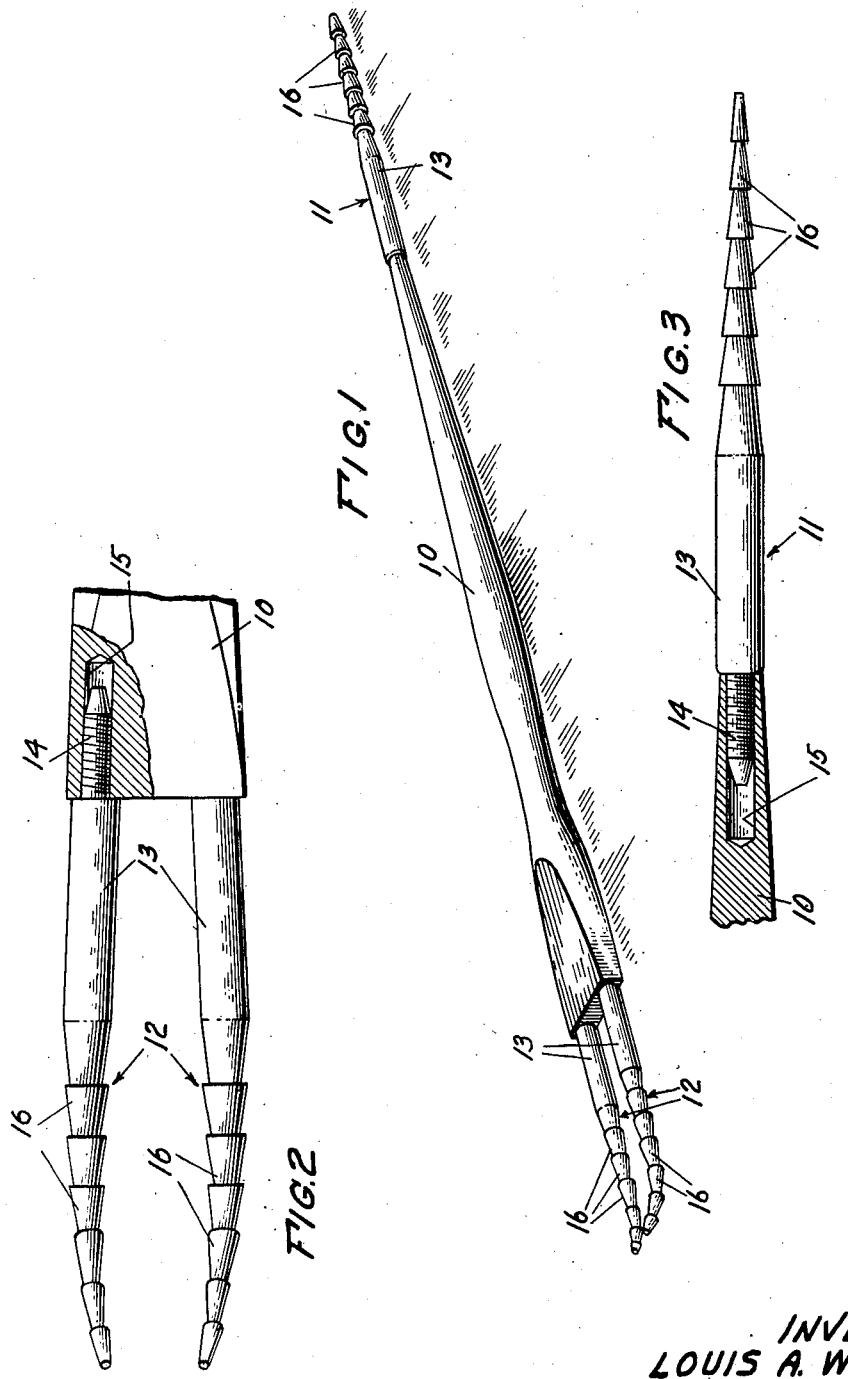

2,607,988

UNITED STATES PATENT OFFICE 2,607,988

LOBSTER FORK

Louis A. Williams, Belmont, Mass.

Application August 13, 1949, Serial No. 110,070

3 Claims. (Cl. 30—322)

This invention relates to utensils, and more particularly, to eating utensils.

While not limited thereto, the present invention is especially useful in removing the meat from the body, claws and legs of boiled, broiled or baked lobsters.

It is among the objects of the present invention to provide a device of the general character indicated which, when inserted into food, for example, of the type above described, so grips the same as to enable the easy withdrawal thereof from its surrounding shell or other outer covering with a minimum of mutilation.

It is a further object of the present invention to provide an instrument as aforesaid which is simple in construction and which is easy and economical to fabricate and assemble.

These, and other objects of the present invention, which will become more apparent as the detailed description progresses, are attained in the following manner.

The device consists, broadly, of a body portion, which functions as a handle, having at one or both ends thereof one or more tines, the tines including a plurality of appropriately shaped, for example, substantially frusto-conical, members for firmly gripping the food into which they are inserted. These members preferably taper in the direction of the outer or free ends of the tines and are preferably of progressively smaller transverse dimension in said direction. Where more than one tine is located at one end of the instrument, these tines are preferably curved toward each other and in a direction at an angle to the axis of the body portion.

In the accompanying specification there shall be described and in the annexed drawing shown an illustrative embodiment of the present invention. It is, however, to be clearly understood that the present invention is not to be limited to the exact details herein shown and described for purposes of illustration only inasmuch as changes therein may be made without the exercise of invention and within the true spirit and scope of the claims hereto appended.

In the annexed drawing, Fig. 1 is a perspective view of a utensil made in accordance with the present invention;

Fig. 2 is an enlarged plan view of one end thereof, partially broken away to show the internal construction; and Fig. 3 is a view similar to Fig. 2 of the opposite end of the device.

Referring now more in detail to the aforesaid illustrative embodiment of the present invention, with particular reference to the drawing illustrating the same, the numeral 10 designates a body portion which may take the form of a rod-like member appropriately shaped, as shown, to provide convenient handling and manipulation. At one end, the body 10 may be provided with a single tine generally designated by reference character 11 and at the other end, said body may be provided with a pair of tines 12.

These tines may comprise rod-like bodies 13 having at one end thereof threaded, reduced portions 14 engageable in threaded recesses 15 in the ends of the body portion 10. At the other ends, the tines may be provided with suitably shaped, for example, substantially frusto-conical, members 16, these members tapering toward the free ends of the tines and having bases of progressively smaller diameter from the inner toward the outer ends of said tines.

Where a single tine is used at one end of the body portion, said tine may be straight and coaxial with said body portion, but where a pair of tines are used, said tines preferably curve toward each other and in a direction at an angle to the axis of the body portion.

The body portion 10 may be made of metal, such as aluminum, and the tines 11 and 12 may be made of stainless steel. If desired, however, the body portion may be of molded or machined plastic material.

This completes the description of the aforesaid illustrative embodiment of the present invention. It will be noted from all of the foregoing that the present invention is simple in construction, easy and economical to fabricate and assemble, and provides a versatile eating instrument, for example, for the removal of meat from the various shell portions of a lobster.

Other objects and advantages of the present invention will readily occur to those skilled in the art to which the same relates.

What is claimed is:

1. A utensil comprising a body portion having at one end thereof a tine provided with a plurality of substantially frusto-conical members, said frusto-conical members tapering, and having bases of progressively smaller diameter, in the direction of the free end of said tine.

2. A utensil comprising a body portion having at one end thereof a pair of tines each of which is provided with a plurality of substantially frusto-conical members, said frusto-conical members tapering in the direction of the free ends of their respective tines, said free ends of said tines curving in a direction at an angle to the axis of said body portion.

3. A utensil comprising a body portion having at one end thereof a pair of tines each of which is provided with a plurality of substantially frusto-conical members, said frusto-conical members tapering and having bases of progressively smaller diameter in the direction of the free ends of their respective tines, said free ends of said tines curving in a direction at an angle to the axis of said body portion.

LOUIS A. WILLIAMS.

REFERENCES CITED

The following references are of record in the file of this patent:

UNITED STATES PATENTS

| Number | Name | Date |
|---|---|---|
| 108,367 | Lathrop | Oct. 18, 1870 |
| 112,959 | Raymond | Mar. 21, 1871 |
| 1,027,269 | Mixa | May 21, 1912 |
| 1,053,005 | Brown | Feb. 11, 1913 |
| 1,327,438 | Lewis | Jan. 6, 1920 |
| 1,816,904 | Heimrath | Aug. 4, 1931 |
| 2,058,966 | Edgar | Oct. 27, 1936 |
| 2,324,886 | Sowders | July 20, 1943 |

FOREIGN PATENTS

| Number | Country | Date |
|---|---|---|
| 260,867 | Great Britain | Nov. 11, 1926 |